United States Patent
Crisci et al.

(10) Patent No.: US 10,667,236 B2
(45) Date of Patent: May 26, 2020

(54) POSITION DETERMINATION OF A WIRELESS DEVICE

(71) Applicant: Telefonaktiebolaget LM Ericsson (publ), Stockholm (SE)

(72) Inventors: Giuseppe Crisci, Lund (SE); Ake Busin, Sollentuna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/450,055

(22) Filed: Jun. 24, 2019

(65) Prior Publication Data

US 2019/0313360 A1    Oct. 10, 2019

Related U.S. Application Data

(62) Division of application No. 14/416,332, filed as application No. PCT/EP2014/076502 on Dec. 4, 2014, now abandoned.

(51) Int. Cl.
*H04W 64/00* (2009.01)
*H04W 4/029* (2018.01)
(Continued)

(52) U.S. Cl.
CPC ........... *H04W 64/00* (2013.01); *H04W 4/029* (2018.02); *H04W 4/90* (2018.02); *H04W 36/0022* (2013.01); *H04W 36/14* (2013.01)

(58) Field of Classification Search
CPC ....... H04W 4/02; H04W 64/00; H04W 8/183; H04W 48/18; H04W 36/30; H04W 36/18;
(Continued)

(56) References Cited

U.S. PATENT DOCUMENTS 8,913,980 B2    12/2014  Zarri et al.
8,942,660 B2*    1/2015  Edge ................ H04W 36/0022
                                                455/404.1
(Continued)

FOREIGN PATENT DOCUMENTS

WO    2014043899 A1    3/2014
WO    2014182214 A1    11/2014

OTHER PUBLICATIONS

PCT International Search Report, dated Aug. 20, 2015, in connection with International Application No. PCT/EP2014/076502, all pages.

(Continued)

*Primary Examiner* — Dai Phuong
(74) *Attorney, Agent, or Firm* — Leffler Intellectual Property Law, PLLC

(57) ABSTRACT

There is provided a method for position determination of a wireless device. The method is performed by the wireless device. The method comprises detecting, whilst being operatively connected to a source radio access technology (RAT) an indicator requiring a handover of the wireless device to a target RAT. The method comprises starting a positioning detection procedure of the wireless device before being handed over to the target RAT, the positioning detection procedure involving processing of positioning measurements. The method comprises keeping the positioning measurements of the positioning detection procedure whilst the wireless device being handed over from the source RAT to the target RAT. The method comprises continuing the positioning detection procedure using the positioning measurements whilst being operatively connected to the target RAT.

8 Claims, 5 Drawing Sheets

(51) Int. Cl.
*H04W 4/90* (2018.01)
*H04W 36/00* (2009.01)
*H04W 36/14* (2009.01)

(58) Field of Classification Search
CPC ..... H04W 36/12; H04W 36/04; H04W 16/32; H04W 24/00; H04W 28/04; H04W 72/082; H04L 29/08657; H04L 29/08108; H04L 29/08936; G01S 5/0252; G01S 5/02; G01S 5/14; G01S 5/0263; G01S 5/0242; G01S 17/48; G01S 5/16; H04M 1/72572; G01C 21/20
See application file for complete search history.

(56) References Cited

U.S. PATENT DOCUMENTS

| | | |
|---|---|---|
| 2011/0116477 A1 | 5/2011 | Wu |
| 2011/0159893 A1* | 6/2011 | Siomina ............... H04W 4/029 455/456.3 |
| 2012/0040687 A1* | 2/2012 | Siomina ............... G01S 5/0205 455/456.1 |
| 2012/0083278 A1* | 4/2012 | Kazmi .................. H04W 36/06 455/440 |
| 2012/0252454 A1 | 10/2012 | Kumpula et al. |
| 2013/0053034 A1 | 2/2013 | Lee et al. |
| 2013/0163560 A1 | 6/2013 | Diachina et al. |
| 2013/0288671 A1* | 10/2013 | Keller .................. H04W 76/18 455/433 |
| 2014/0256323 A1 | 9/2014 | Edge et al. |
| 2014/0378087 A1 | 12/2014 | Umatt et al. |
| 2015/0004924 A1 | 1/2015 | Kim et al. |
| 2015/0111518 A1 | 4/2015 | Ueda et al. |
| 2015/0195811 A1* | 7/2015 | Wu ....................... H04W 64/00 455/436 |
| 2015/0282038 A1 | 10/2015 | Souissi et al. |
| 2015/0358875 A1 | 12/2015 | Kashikar et al. |
| 2017/0006426 A1* | 1/2017 | Fu ......................... H04W 24/08 |
| 2017/0223554 A1 | 8/2017 | Chou et al. |
| 2017/0251448 A1* | 8/2017 | Edge ..................... H04L 67/18 |

OTHER PUBLICATIONS

PCT Written Opinion, dated Aug. 20, 2015, in connection with International Application No. PCT/EP2014/076502, all pages.

3GPP TS 23.271, V11.3.0, Technical Specification Group Services and System Aspects; Functional stage 2 description of location Services (LCS) (Release 11), Jun. 20, 2014, 169 pages.

3GPP TS 25.305, V12.0.0, Technical Specification Group Radio Access Network; Stage 2 functional specification of User Equipment (UE) positioning in UTRAN (release 12), Dec. 2013, 80 pages.

3GPP TS 43.059, V12.0.0, Technical Specification Group GSM/EDGE Radio Access Network; Functional stage 2 description of Location Services (LCS) in GERAN (Release 12), Feb. 2014, 69 pages.

3GPP TS 23.272, V12.4.0, Technical Specification Group Services and System Aspects; Circuit Switched (CS) fallback in Evolved Packet System (EPS); Stage 2 (Release 12), Sep. 2014, 100 pages.

FCC 99-245—"Revision of the Commission's rules to ensure compatibility with enhanced 911 Emergency Calling Systems", Released Oct. 6, 1999, 57 pages.

European Communication dated Jun. 13, 2019 in connection with European Application No. 14811804.5, 7 pages.

3GPP TS 23.272 V11.1.0, Jun. 2012, 3rd Generation Partnership Project; Technical Specification Group Services and System Aspects; Circuit Switched (CS) fallback in Evolved Packet System (EPS); Stage 2, Release 11, pp. 1-90.

* cited by examiner

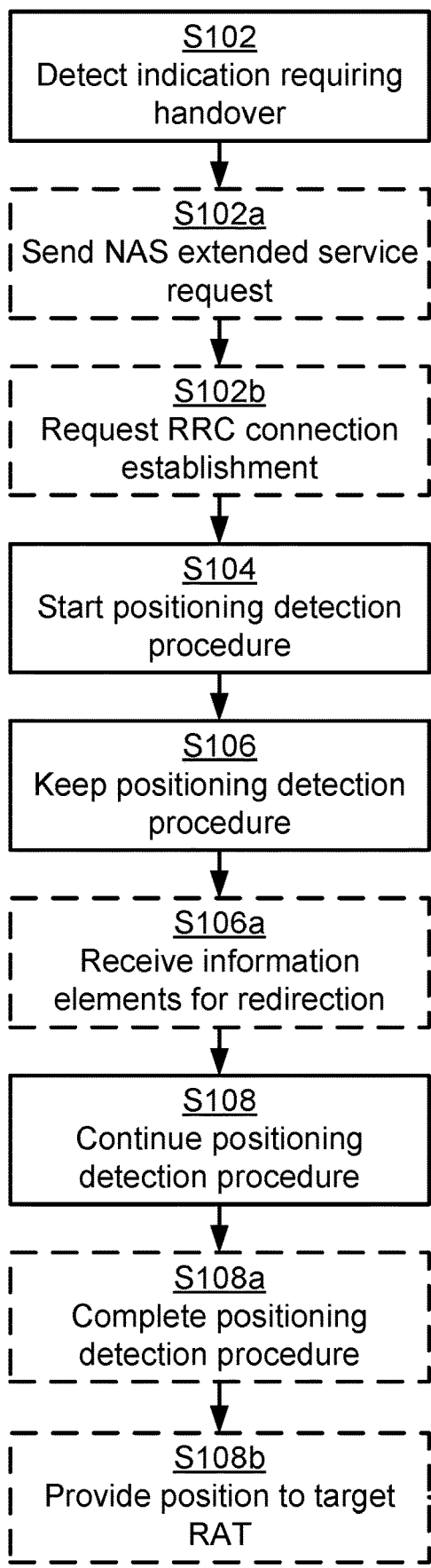
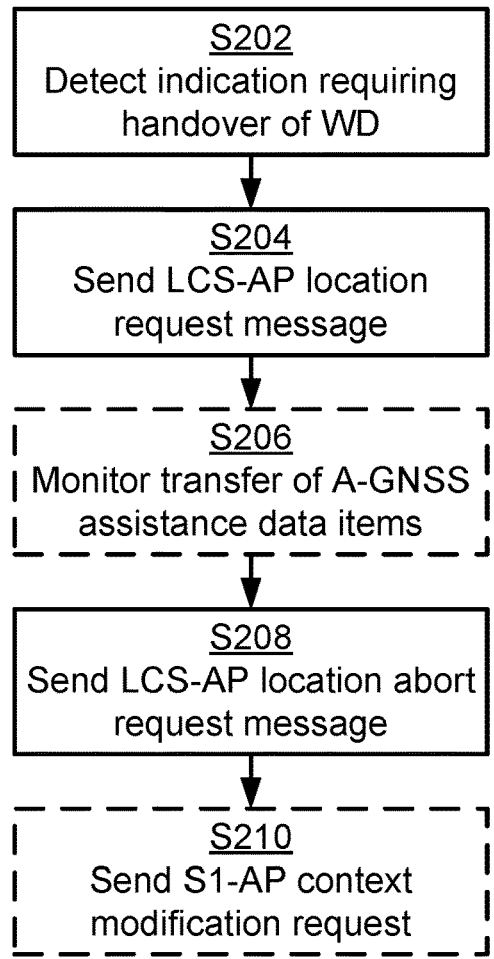
Fig. 8
Fig. 6
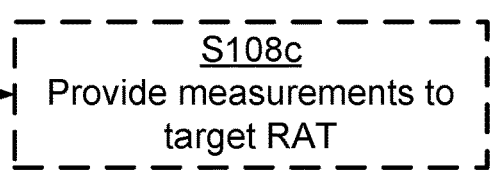

POSITION DETERMINATION OF A WIRELESS DEVICE

CROSS-REFERENCE TO RELATED APPLICATIONS

This application claims the benefit of U.S. application Ser. No. 14/416,332 filed Jan. 22, 2015 (Section 371(c) date), which is a 371 national stage of PCT/EP2014/076502 filed Dec. 4, 2014. Both of these earlier applications are hereby incorporated herein by reference in their entireties.

TECHNICAL FIELD

Embodiments presented herein relate to position determination of a wireless device, and particularly to methods, a wireless device, a mobility management node, computer programs, and a computer program product for position determination of a wireless device.

BACKGROUND

In communications networks, there may be a challenge to obtain good performance and capacity for a given communications protocol, its parameters and the physical environment in which the communications network is deployed.

For example, wireless devices incorporating radio access technologies (RATs) defined by the telecommunications standards Global System for Mobile Communications (GSM), Wideband Code Division Multiple Access (WCDMA), Long Term Evolution (LTE), etc., may be configured to perform specific services, such as emergency calls. Such specific services may further involve the wireless device to use positioning technologies such as the Global Positioning System (GPS), or the Globalnaya navigatsionnaya sputnikovaya Sistema (GLONASS), also known as the Global Navigation Satellite System.

In the United States, the Federal Communications Commission (FCC) is forcing network operators to implement solutions to accurately locate wireless devices performing emergency calls within their networks. At the present date, these accuracy requirements are: 1) 50 meters for 67% of the calls, and 150 meters for 95% of the calls when the position is determined by the wireless device (so-called wireless device-based determination), and 2) 100 meters for 67% of the calls, and 300 meters for 95% of the calls when the position is determined by the network as assisted by the wireless device (so-called wireless device-assisted determination).

For GSM/WCDMA-type networks, network operators have adopted a mechanism called Network Induced Location Request (NILR), see 3GPP TS 23.271—"Functional stage 2 description of Local services (LCS)". In general terms, when the wireless device triggers an emergency circuit switched (CS) call, the GSM/WCDMA-type networks start a NILR positioning procedure in parallel with the emergency call setup. The output of this procedure is the location information of the wireless device. The positioning method used is decided by the radio access network (RAN).

In order to achieve, and possibly exceed the FCC accuracy requirements, global navigation satellite system (GNSS) positioning technologies such as GPS (and more recently also GLONASS) are used, provided that the wireless device supports them. For both wireless device-based and wireless device-assisted approaches, the wireless device may be regarded as taking a vital role in determining its location either by calculating it itself (wireless device-based) or by providing the RAN with the GNSS measurement results needed for the calculation (wireless device-assisted).

In scenarios where a wireless device is operatively connected to an LTE-type network and not capable to perform Internet Protocol Multimedia Subsystem (IMS) emergency calls, an emergency call attempt will results in a CS fallback procedure as described in 3GPP TS 23.272—"Circuit Switched (CS) fallback in Evolved Packet System (EPS)". Examples of some conditions are (but not limited to) the following: 1) the wireless device does not have Voice over LTE (VoLTE) capabilities, 2) the wireless device has VoLTE capabilities but is registered over a network which does not support VoLTE, and 3) the wireless device has VoLTE capabilities but is registered over a network which does not support an IMS emergency services (this information is in LTE broadcasted in the Broadcast Control Channel (BCCH) downlink (DL) Synchronization Channel (SCH) first system information block (SIB1)).

In general terms, the CS fallback procedure requires the wireless device to perform a RAT change; from LTE to WCDMA, or from LTE to GSM, for example according to network deployment and reported capabilities of the wireless device. The LTE RAN triggers the RAT change by sending to the wireless device a Radio Resource Control (RRC) Connection Release message, which includes information elements for redirection of the wireless device to the new RAT.

Once the wireless device synchronizes with the network node in the new RAT, the emergency call will be set up and the NILR positioning procedure will then take place.

In scenarios where a wireless device is operatively connected to an LTE network and attempting to set up an emergency call via a CS fallback procedure, existing mechanisms thus require the wireless device to perform a RAT change before receiving the NILR request with GNSS assistance information. This delays the location determination of the wireless device, which location determination procedure is triggered only once the wireless device is redirected to the new RAT.

In scenarios where the wireless device is capable to perform IMS emergency calls, a positioning procedure may be started already when the wireless device is operatively connected to an LTE network. However, in the occurrence of Single Radio-Voice Call Continuity (SRVCC) the positioning procedure would be aborted. Thus, in scenarios where the wireless device is performing an IMS emergency call, a positioning procedure started when the wireless device is operatively connected to the LTE network will be aborted if an SRVCC procedure is triggered.

Hence, there is still a need for an improved position determination of a wireless device.

SUMMARY

An object of embodiments herein is to provide efficient position determination of a wireless device.

According to a first aspect there is presented a method for position determination of a wireless device. The method is performed by the wireless device. The method comprises detecting, whilst being operatively connected to a source radio access technology (RAT) an indicator requiring a handover of the wireless device to a target RAT. The method comprises starting a positioning detection procedure of the wireless device before being handed over to the target RAT, the positioning detection procedure involving processing of positioning measurements. The method comprises keeping the positioning measurements of the positioning detection procedure whilst the wireless device being handed over from the source RAT to the target RAT. The method comprises continuing the positioning detection procedure using the positioning measurements whilst being operatively connected to the target RAT.

Advantageously this provides efficient position determination of a wireless device.

Advantageously this enables a fast position determination of the wireless device since the wireless device will trigger the positioning determination whilst being operatively connected to a source RAT and complete the positioning determination after having been redirected, or handed over, to the target RAT.

According to a second aspect there is presented a wireless device for position determination of the wireless device. The wireless device comprises a processing unit. The processing unit is configured to detect, whilst being operatively connected to a source radio access technology (RAT) an indicator requiring a handover of the wireless device to a target RAT. The processing unit is configured to start a positioning detection procedure of the wireless device before being handed over to the target RAT, the positioning detection procedure involving processing of positioning measurements. The processing unit is configured to keep the positioning measurements of the positioning detection procedure whilst the wireless device is being handed over from the source RAT to the target RAT. The processing unit is configured to continue the positioning detection procedure using the positioning measurements whilst being operatively connected to the target RAT.

According to a third aspect there is presented a computer program for position determination of a wireless device, the computer program comprising computer program code which, when run on a processing unit of a wireless device, causes the processing unit to perform a method according to the first aspect.

According to a fourth aspect there is presented a method for position determination of a wireless device. The method is performed by a mobility management node. The method comprises detecting an indication of a wireless device being operatively connected to a source radio access technology (RAT), the indication requiring a handover of the wireless device to a target RAT. The method comprises, in response thereto, sending a Location Services Application Protocol (LCS-AP) location request message to an evolved serving mobile location center (E-SMLC) of the wireless device. The method comprises sending, upon fulfillment of a criterion relating to the indication of the wireless device, a LCS-AP location abort request message to the E-SMLC.

According to a fifth aspect there is presented a mobility management node for position determination of a wireless device. The mobility management node comprises a processing unit. The processing unit is configured to detect an indication of a wireless device being operatively connected to a source radio access technology (RAT), the indication requiring a handover of the wireless device to a target RAT. The processing unit is configured to, in response thereto, send a Location Services Application Protocol (LCS-AP) location request message to an evolved serving mobile location center (E-SMLC) of the wireless device. The processing unit is configured to send, upon fulfillment of a criterion relating to the indication of the wireless device, a LCS-AP location abort request message to the E-SMLC.

According to a sixth aspect there is presented a computer program for position determination of a wireless device, the computer program comprising computer program code which, when run on a processing unit of a mobility management node, causes the processing unit to perform a method according to the fourth aspect.

According to a seventh aspect there is presented a computer program product comprising a computer program according to at least one of the third aspect and the sixth aspect and a computer readable means on which the computer program is stored.

According to an eight aspect there is presented a system comprising at least one wireless device according to the second aspect and at least one mobility management node according to the fifth aspect.

It is to be noted that any feature of the first, second, third, fourth, fifth, sixth, seventh and eight aspects may be applied to any other aspect, wherever appropriate. Likewise, any advantage of the first aspect may equally apply to the second, third, fourth, fifth, sixth, seventh, and/or eight aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 5, 6, 7, and 8 are flowcharts of methods according to embodiments; and

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
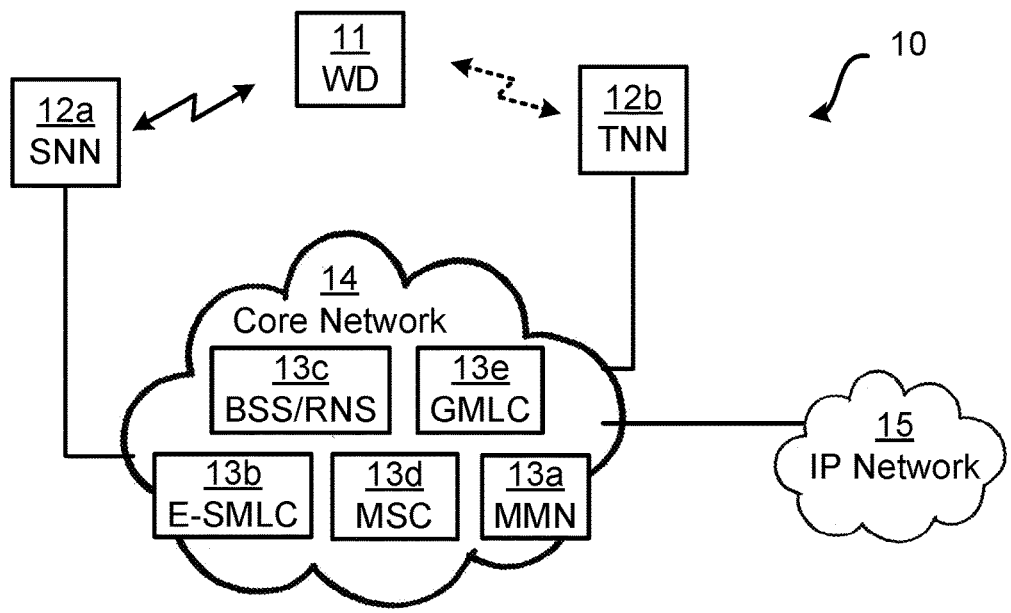
FIG. 1 is a schematic diagram illustrating a communication network according to embodiments.

FIG. 1 is a schematic diagram illustrating a communications network 10 where embodiments presented herein can be applied. The communications network 10 comprises network nodes 12a, 12b. The network nodes 12a, 12b may be radio access network (RAN) nodes. The network nodes may be radio base stations, base transceiver stations (BTSs), node Bs (NBs), and/or evolved node Bs (eNBs).

The network nodes 12a, 12b are operatively connected to entities of a core network 14. Examples of these entities include, but are not limited to, a Mobility Management Node (MMN) 13a, such as a Mobility Management Entity (MME), an Evolved Serving Mobile Location Center (E-SMLC) 13b, a Base station subsystem/Radio network subsystem (BSS/RNS) 13c, a Mobile Switching Center (MSC) 13d, and a Gateway Mobile Location Center (GMLC) 13e. The functionalities of these entities are as such known in the art and further description thereof is therefore omitted. However, further functionality of the mobility management node 13a as related to the herein disclosed embodiments will be disclosed below. As is understood by the skilled person, the core network 14 may comprise further entities performing their ordinary functionality as known in the art. The core network 14 is in turn operatively connected to a service and data providing Internet protocol (IP) network 15.

A wireless device (WD) 11 may thus, by establishing a connection to one of the network nodes 12a, 12b access data and services of the IP network 15. Examples of wireless devices 11 include, but are not limited to, mobile stations, mobile phones, handsets, wireless local loop phones, user equipment (UE), smartphones, laptop computers, tablet computers, sensors, Internet-of-Things (IoT) devices, etc.

One of the network nodes 12a acts as the serving, or source, network node (SNN) 12a of the wireless device 11, and the other of the network nodes 12b acts as the target network node (TNN) 12b of the wireless device 11. Thus, during a handover procedure the wireless device 11 may be handed over from the SNN 12a to the TNN 12b. The source network node 12a may be associated with a first, source, radio access technology (RAT), and the target network node 12b may be associated with a second, target, RAT. The target RAT is different from the source RAT. Examples of RATs will be provided below. It is assumed that the wireless device 11 being operatively connected to a source/target network node has the same technical meaning as the wireless device 11 being operatively connected to a source/target RAT. Thus, the terms source/target network node and source/target RAT may be used interchangeably.

As the skilled person understands, the communications network 10 may comprise a plurality of network nodes 12a, 12b. Further, as the skilled person also understands, a plurality of wireless devices 11 may be operatively connected to each such network node 12a, 12b.

Assume a scenario where the wireless device 11 sets up an emergency call requiring circuit switched fall back (CSFB) while being served by an LTE-based RAT. As noted above, emergency calls are an example of services which may require position determination of the wireless device 11. When the wireless device 11 sets up such a CSFB emergency call, the LTE network should provide GNSS assistance information to the wireless device 11. The LTE network is already aware about the emergency situation because the wireless device 11 may attempt the emergency call by sending a non-access stratum (NAS) Extended Service Request with "service type" information element set to "emergency call". The core network of the LTE network is therefore notified about the request cause. Further, the wireless device 11 may requests RRC Connection establishment to the LTE network with information element "establishment cause" set to "emergency". Therefore the LTE network is notified about the request cause.

Therefore, the wireless device 11 may start its positioning determination whilst still operatively connected to an LTE-based source RAT and continue the positioning determination when operatively connected to a non-LTE-based target RAT. Further, the network should take the necessary actions to expect the positioning procedure to continue and be finalized in the target RAT. Also in case the wireless device 11 has an ongoing IMS emergency call with positioning procedure the positioning procedure should continue in the target RAT even if an SRVCC occurs. These issues are examples of some of the issues addressed by the embodiments presented herein. The embodiments disclosed herein thus relate to position determination of a wireless device 11. In order to obtain such position determination there is provided a wireless device 11, a method performed by the wireless device 11, a computer program comprising code, for example in the form of a computer program product, that when run on a processing unit of the wireless device 11, causes the processing unit to perform the method. In order to obtain such position determination there is further provided a mobility management node 13a, a method performed by the mobility management node 13a, and a computer program comprising code, for example in the form of a computer program product, that when run on a processing unit of the mobility management node 13a, causes the processing unit to perform the method.

Figure 2A:
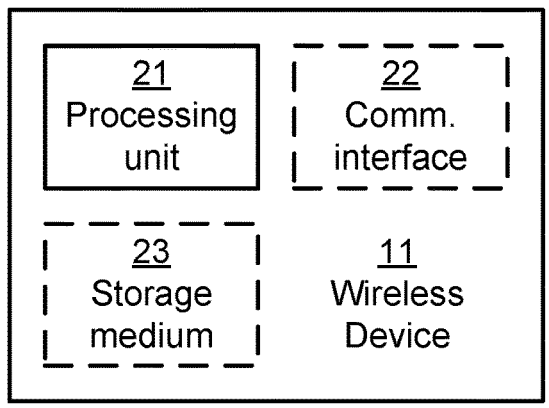
FIG. 2a is a schematic diagram showing functional units of a wireless device according to an embodiment.

FIG. 2a schematically illustrates, in terms of a number of functional units, the components of a wireless device 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The wireless device 11 may further comprise a communications interface 22 for communications with a source network node 12a and a target network node 12b. As such the communications interface 22 may comprise one or more transmitters and receivers, comprising analogue and digital components and a suitable number of antennas for radio communications. The processing unit 21 controls the general operation of the wireless device 11 e.g. by sending data and control signals to the communications interface 22 and the storage medium 23, by receiving data and reports from the communications interface 22, and by retrieving data and instructions from the storage medium 23. Other components, as well as the related functionality, of the wireless device 11 are omitted in order not to obscure the concepts presented herein.

Figure 2B:
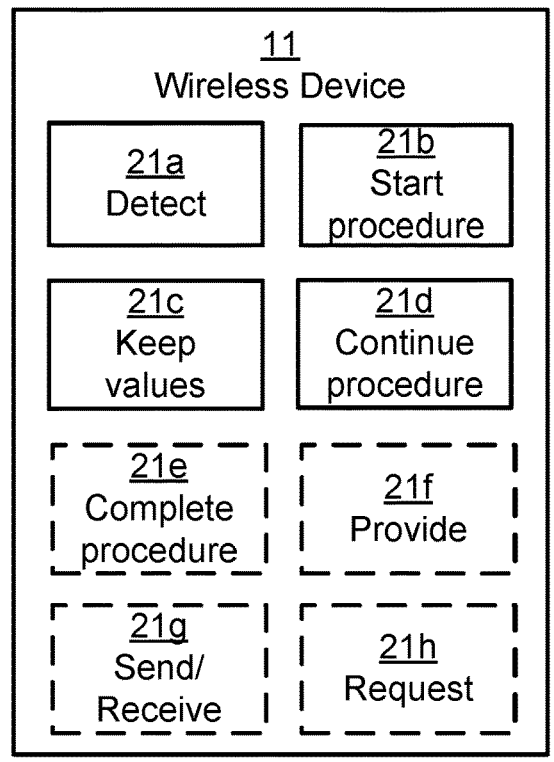
FIG. 2b is a schematic diagram showing functional modules of a wireless device according to an embodiment.

FIG. 2b schematically illustrates, in terms of a number of functional modules, the components of a wireless device 11 according to an embodiment. The wireless device 11 of FIG. 2b comprises a number of functional modules; a detect module 21a configured to perform below step S102, a start procedure module 21b configured to perform below step S104, a keep values module 21c configured to perform below step S106, and a continue procedure module 21d configured to perform below step S108. The wireless device 11 of FIG. 2b may further comprise a number of optional functional modules, such as any of a complete procedure module 21d configured to perform below step S108a, a provide module 21f configured to perform below steps S108b, S108c, a send and/or receive module configured to perform below steps S102a, S106a, and a request module 21h configured to perform below step S102b. The functionality of each functional module 21a-h will be further disclosed below in the context of which the functional modules 21a-h may be used. In general terms, each functional module 21a-h may be implemented in hardware or in software. Preferably, one or more or all functional modules 21a-h may be implemented by the processing unit 21, possibly in cooperation with functional units 22 and/or 23. The processing unit 21 may thus be arranged to from the storage medium 23 fetch instructions as provided by a functional module 21a-h and to execute these instructions, thereby performing any steps as will be disclosed hereinafter.

Figure 3A:
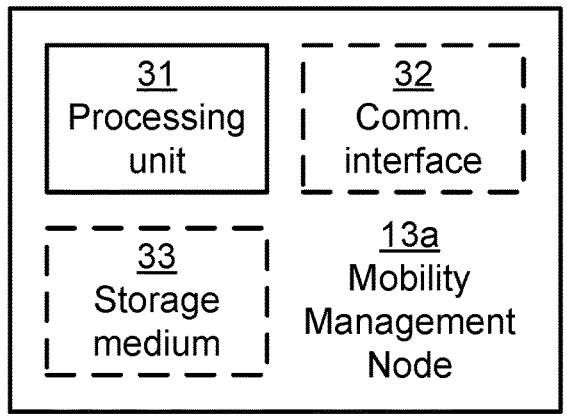
FIG. 3a is a schematic diagram showing functional units of mobility management node according to an embodiment.

FIG. 3a schematically illustrates, in terms of a number of functional units, the components of a mobility management node 13a according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The mobility management node 13a may further comprise a communications interface 32 for communications with functional entities and devices in the core network 14 as well as network nodes 12a, 12b of radio access networks. As such the communications interface 32 may comprise one or more transmitters and receivers, comprising analogue and digital components and a suitable number of interfaces for wireline communications. The processing unit 31 controls the general operation of the mobility management node 13a e.g. by sending data and control signals to the communications interface 32 and the storage medium 33, by receiving data and reports from the communications interface 32, and by retrieving data and instructions from the storage medium 33. Other components, as well as the related functionality, of the mobility management node 13a are omitted in order not to obscure the concepts presented herein.

Figure 3B:
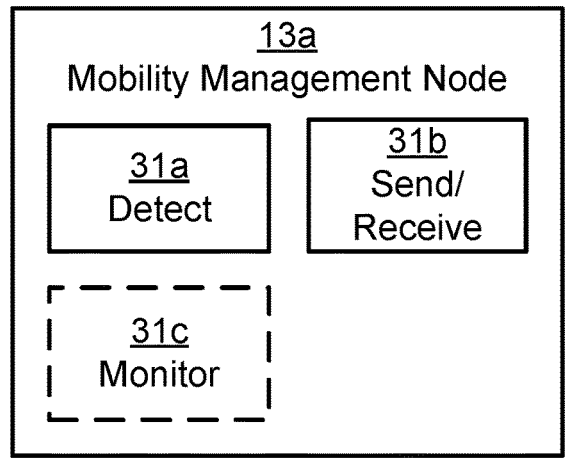
FIG. 3b is a schematic diagram showing functional modules of a mobility management node according to an embodiment.

FIG. 3b schematically illustrates, in terms of a number of functional modules, the components of a mobility management node 13a according to an embodiment. The mobility management node 13a of FIG. 3b comprises a number of functional modules; a detect module 31a configured to perform below step S202, and a send and/or receive module 31b configured to perform below steps S04, S208, S210. The mobility management node 13a of FIG. 3b may further comprise a number of optional functional modules, such as a monitor module 31c configured to perform below step S06. The functionality of each functional module 31a-c will be further disclosed below in the context of which the functional modules 31a-c may be used. In general terms, each functional module 31a-c may be implemented in hardware or in software. Preferably, one or more or all functional modules 31a-c may be implemented by the processing unit 31, possibly in cooperation with functional units 32 and/or 33. The processing unit 31 may thus be arranged to from the storage medium 33 fetch instructions as provided by a functional module 31a-c and to execute these instructions, thereby performing any steps as will be disclosed hereinafter.

The mobility management node 13a may be provided as a standalone device or as a part of a further device. For example, the mobility management node 13a may be, or be provided in, a Mobility Management Entity, MME.

A system may comprise at least one wireless device configured according to embodiments presented herein and at least one mobility management node configured according to embodiments presented herein.

Figure 4:
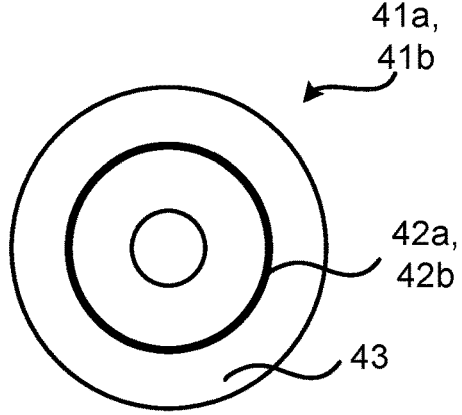
FIG. 4 shows one example of a computer program product comprising computer readable means according to an embodiment.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods according to embodiments described herein. The computer program 42a and/or computer program product 41a may thus provide means for performing any steps of the wireless device 11 as herein disclosed. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer program 42b and/or computer program product 41b may thus provide means for performing any steps of the mobility management node 13a as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42a, 42b is here schematically shown as a track on the depicted optical disk, the computer program 42a, 42b can be stored in any way which is suitable for the computer program product 41a, 41b.

Figure 5:
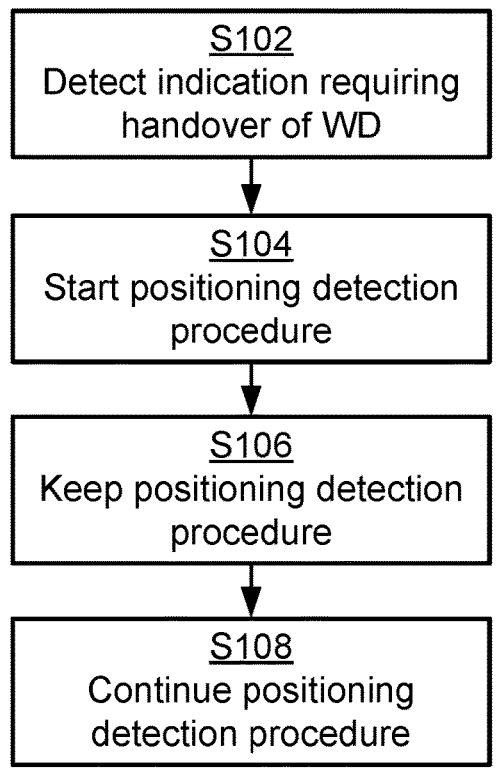
Figure 7:
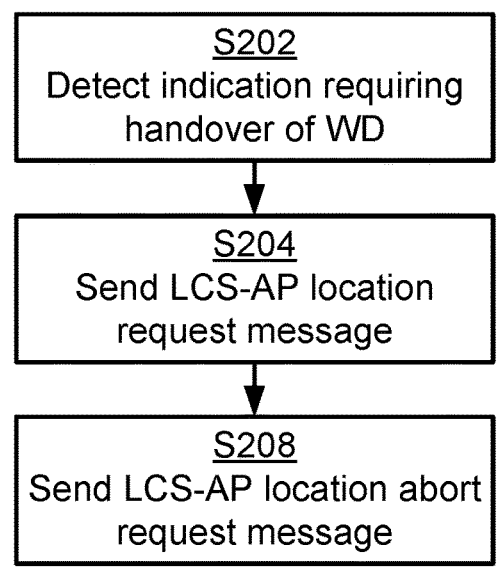

FIGS. 5 and 6 are flow charts illustrating embodiments of methods for position determination of a wireless device 11 as performed by the wireless device 11. FIGS. 7 and 8 are flow charts illustrating embodiments of methods for position determination of a wireless device 11 as performed by the mobility management node 13a. The methods are advantageously provided as computer programs 42a, 42b.

Reference is now made to FIG. 5 illustrating a method for position determination of a wireless device 11 as performed by the wireless device 11 according to an embodiment.

The wireless device 11 is configured to, in a step S102, detect an indicator requiring a handover of the wireless device to a target RAT. Examples of such an indicator (and thus how it may be detected) will be provided below. The indicator is detected whilst the wireless device 11 is operatively connected to a source RAT. Examples of source RATs and target RATs will be provided below.

The indicator further requires a position of the wireless device 11 to be determined. Hence, the wireless device 11 is configured to, in a step S104, start a positioning detection procedure of the wireless device 11. In general terms, this procedure should start as early as possible. Particularly, this procedure is started before the wireless device 11 is handed over to the target RAT. The positioning detection procedure involves processing of positioning measurements. Examples of such positioning measurements and how they may be processed will be provided below.

Instead of dropping the measurements and/or aborting the positioning detection procedure, the measurements are kept during the handover of the wireless device. Thus, the wireless device 11 is configured to, in a step S106, keep the positioning measurements of the positioning detection procedure whilst the wireless device 11 is handed over from the source RAT to the target RAT.

Once in the target RAT, the wireless device 11 may then continue the positioning detection procedure using the kept positioning measurements. Hence, the wireless device 11 is configured to, in a step S108, continue the positioning detection procedure using the positioning measurements whilst being operatively connected to the target RAT.

When the wireless device 11 participates in, e.g., a CSFB procedure, for example due to an emergency call, the source RAT network already triggers a positioning procedure and sends positioning assistance information to the wireless device 11 before the wireless device 11 performs the RAT change (i.e., from being operatively connected to a source network node 12a in the source RAT to being operatively connected to a target network node 12b in the target RAT). The wireless device 11 is thereby enabled to start performing its positioning determination procedure and continue this procedure whilst the RAT change procedure is still ongoing. The positioning determination procedure will continue during the RAT change and be finalized when the wireless device 11 is operatively connected to the target RAT.

Embodiments relating to further details of position determination of a wireless device 11 as performed by the wireless device 11 will now be disclosed.

The indicator may be an emergency call indicator. Hence the wireless device 11 may detect the indicator during set-up of the emergency call.

There may be different reasons for the wireless device 11 to be handed over. For example, the wireless device 11 may not be capable of performing Internet protocol multimedia subsystem (IMS) emergency calls in the source RAT.

There may be different types of handover procedures. According to one example, the handover involves a circuit switched fallback (CSFB) of the wireless device 11. According to another example, the handover involves a single radio voice call continuity (SRVCC) procedure.

The positioning detection procedure may involve the wireless device 11 to perform, or take part in, at least one sub-procedure. According to a first example, the positioning detection procedure involves a sub-procedure of performing a network initiated location request (NILR) positioning procedure whilst being operatively connected to the source RAT.

The positioning measurements may be global navigation satellite system (GNSS) measurements. The GNSS measurements may be assisted GNSS (A-GNSS) assistance data items. The A-GNSS assistance data items may be received from an evolved serving mobile location center (E-SMLC). Hence, the wireless device 11 may be configured to acquire such measurements and/or data items.

In scenarios where the wireless device 11 has an ongoing IMS emergency call and an ongoing emergency positioning procedure, if SRVCC occurs the positioning procedure may continue sufficiently long for Assistance Data and GNSS measurements to be delivered to the wireless device 11.

The source RAT may be a Long Term Evolution (LTE) compliant network. Hence, in the source RAT the wireless device 11 may be operatively connected to a source network node 12a being an eNB.

The target RAT may be a non-LTE compliant network, such as GSM or WCDMA. Hence, in the source RAT the wireless device 11 may be operatively connected to a target network node 12b not being an eNB (such as an NB or a BTS).

Reference is now made to FIG. 6 illustrating methods for position determination of a wireless device 11 as performed by the wireless device 11 according to further embodiments.

There may be different ways for the wireless device 11 to continue the positioning detection procedure. Different embodiments relating thereto will now be described in turn.

For example, the process may be complete by the wireless device 11 returning either the position (i.e., a wireless device-based approach) or the measurement results (i.e., a wireless device-assisted approach) once in the new RAT.

Hence, according to one embodiment (wireless device-based approach) the wireless device 11 is configured to, in an optional step S108a, continue the positioning detection procedure by completing the positioning detection procedure so as to determine a position of the wireless device 11; and, in an optional step S108b, provide the position to the target RAT.

Hence, according to another embodiment (wireless device-assisted approach) the wireless device 11 is configured to, in an optional step S108c, provide the positioning measurements to the target RAT.

There may be different ways for the wireless device 11 to respond to having detected the indicator in step S102.

For example, the wireless device 11 may be configured to in response to detecting the indicator, in an optional step S102a, send a non-access stratum (NAS) extended service request with a service type information element set to emergency call to the source RAT.

For example, the wireless device 11 may be configured to in response to detecting the indicator, in an optional step S102b, request a radio resource control (RRC) connection establishment with information element establishment cause set to emergency to the source RAT.

There may be different ways for the wireless device 11 to be handed over. For example, being handed over from the source RAT to the target RAT may require the wireless device 11 to be configured to, in an optional step S106a, receive information elements for redirection of the wireless device 11 to the target RAT. The information elements for redirection may be received in a RRC connection release message.

Reference is now made to FIG. 7 illustrating a method for position determination of a wireless device 11 as performed by the mobility management node 13a according to an embodiment.

The mobility management node 13a is configured to, in a step S202, detect an indication of a wireless device 11. As noted above, the wireless device 11 is operatively connected to a source RAT. As noted above, the indication requires a handover of the wireless device 11 to a target RAT.

The mobility management node 13a is configured to, in response thereto, in a step S204 send a Location Services Application Protocol (LCS-AP) location request message to an evolved serving mobile location center (E-SMLC) 16 of the wireless device 11.

The mobility management node 13a is configured to, in a step S208, send, upon fulfillment of a criterion relating to the indication of the wireless device 11, a LCS-AP location abort request message to the E-SMLC 13b.

Embodiments relating to further details of position determination of a wireless device 11 as performed by the mobility management node 13a will now be disclosed.

As noted above, the indicator may be an emergency call indicator.

Reference is now made to FIG. 8 illustrating methods for position determination of a wireless device 11 as performed by the mobility management node 13a according to further embodiments.

There may be different ways for the mobility management node 13a to determine whether the criterion is fulfilled or not. Different embodiments relating thereto will now be described in turn.

According to one embedment the criterion relates to the number of packets sent to the wireless device 11. Therefore, the mobility management node 13a may be configured to, in an optional step S206, monitor transmission of assisted GNSS (A-GNSS) assistance data items from the E-SMLC 13b to the wireless device 11. The criterion may then be fulfilled when a configured number of data items have been sent from the E-SMLC 13b to the wireless device 11.

According to another embedment the criterion relates to the time elapsed. For example, the criterion may be fulfilled when a configured time interval starting at the detection of the indication has finished.

As noted above, the handover of the wireless device 11 may be required due to CSFB of the wireless device 11. Therefore, the mobility management node 13a may be configured to, in an optional step S210, send an S1-AP context modification request. The S1-AP context modification request may comprise a circuit switched fallback indicator. The S1-AP context modification request may be sent to the source RAT upon the mobility management node 13a having sent the LCS-AP location abort request.

Figure 9:
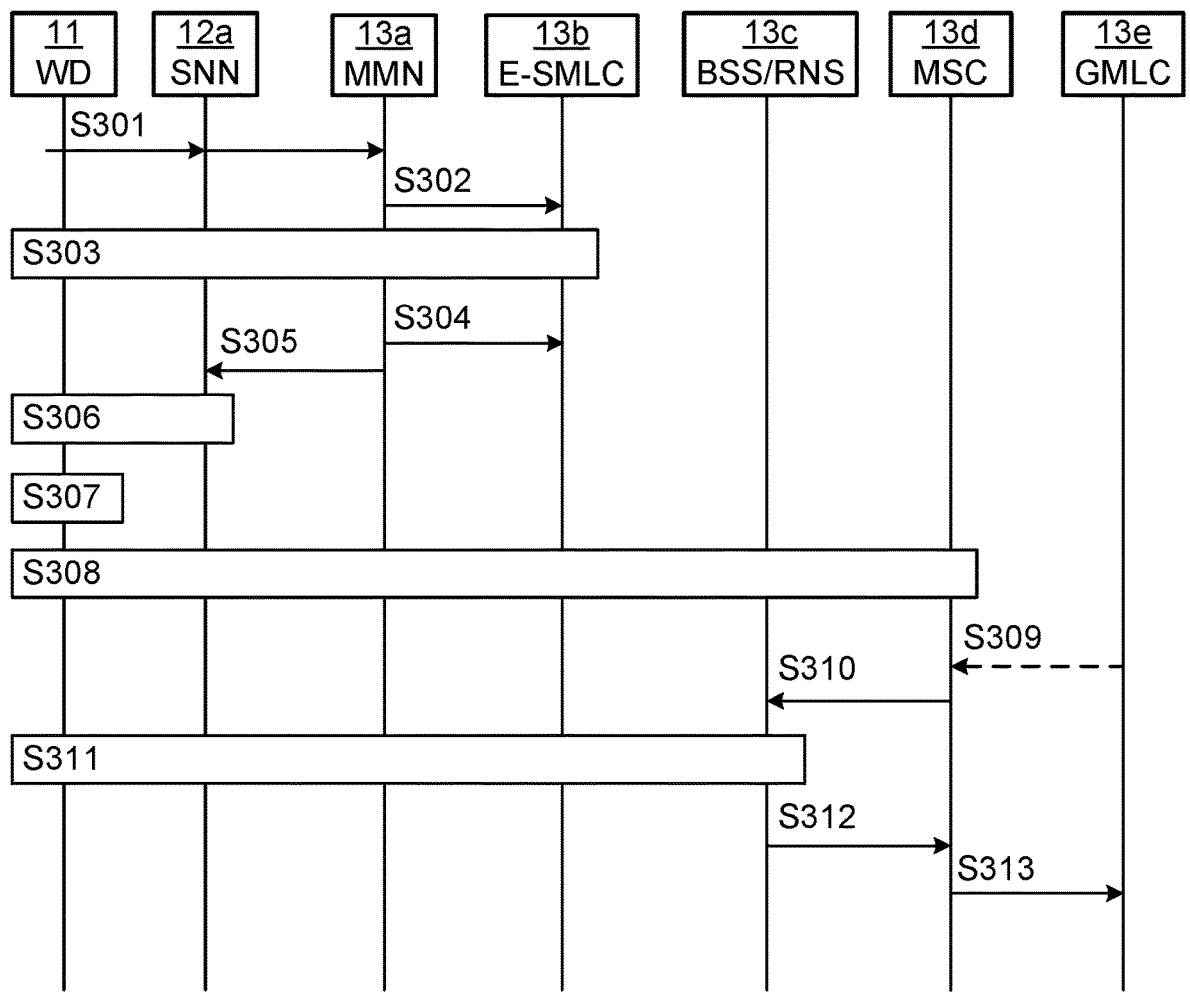
FIGS. 9 and 10 are signaling diagrams of methods according to embodiments.

A first particular embodiment for position determination of a wireless device 11 based on at least some of the above disclosed embodiments will now be disclosed in detail with reference to the signaling diagram of FIG. 9. The first particular embodiment relates to a CSFB scenario.

S301: The wireless device 11 makes an Extended Service Request for mobile originating CSFB indicating that the purpose is an emergency call. One way to implement step S301 is to perform any of step S102, step S102a and/or step S102b.

S302: The mobility management node 13a detects the request for emergency call CSFB and also confirms from capabilities of the wireless device 11 that the wireless device 11 supports LPP. Instead of immediately starting the CSFB procedure the mobility management node 13a first sends an LCS-AP Location Request message to the E-SMLC 13b. One way to implement step S302 is to perform step S202.

S303: The E-SMLC 13b delivers a preconfigured set of A-GNSS Assistance Data to the wireless device 11 and sends a LPP request Location Information requesting GNSS measurements. One way to implement step S303 is to perform any of step S104 and step S206.

S304: After a configured number of LCS-AP messages has been delivered to the wireless device 11 and/or after timeout, the mobility management node 13a sends an LCS-AP Location Abort Request to the E-SMLC 13b. One way to implement step S304 is to perform step S208.

S305: The mobility management node 13a sends an S1-AP Context Modification Request with a CSFB indicator to the source network node 12a. One way to implement step S305 is to perform step S210.

S306: The source network node 12a sends a Cell RRC Connection Release message to the wireless device 11. The wireless device 11 thus receives the Cell RRC Connection Release message. One way to implement step S306 is to perform any of step S106a and step S210.

S307: The wireless device 11 keeps received Assistance Data and, if feasible, continues its started processing of received GNSS measurements. One way to implement step S307 is to perform any of step S106.

S308: Fall back of the wireless device 11 is performed by the wireless device 11 being handed over to a target network node 12b in GERAN or UTRAN. One way to implement step S308 is to perform step S106a.

S309: After having been informed of the handover of the wireless device the GMLC 13e may send a Location Request message.

S310: The MSC 13d sends a Location Request message to the BSS/RNS 13c. This may be triggered by the request from the GMLC 13e or triggered internally in the MSC 13d due to an emergency call being set up by the wireless device 11.

S311: The BSS/RNS 13c initiates a positioning procedure.

S312: A Location Response is sent from the BSS/RNS 13c to the MSC 13d.

S313: The MSC 13d sends a Location Response to the GMLC 13e.

Figure 10:
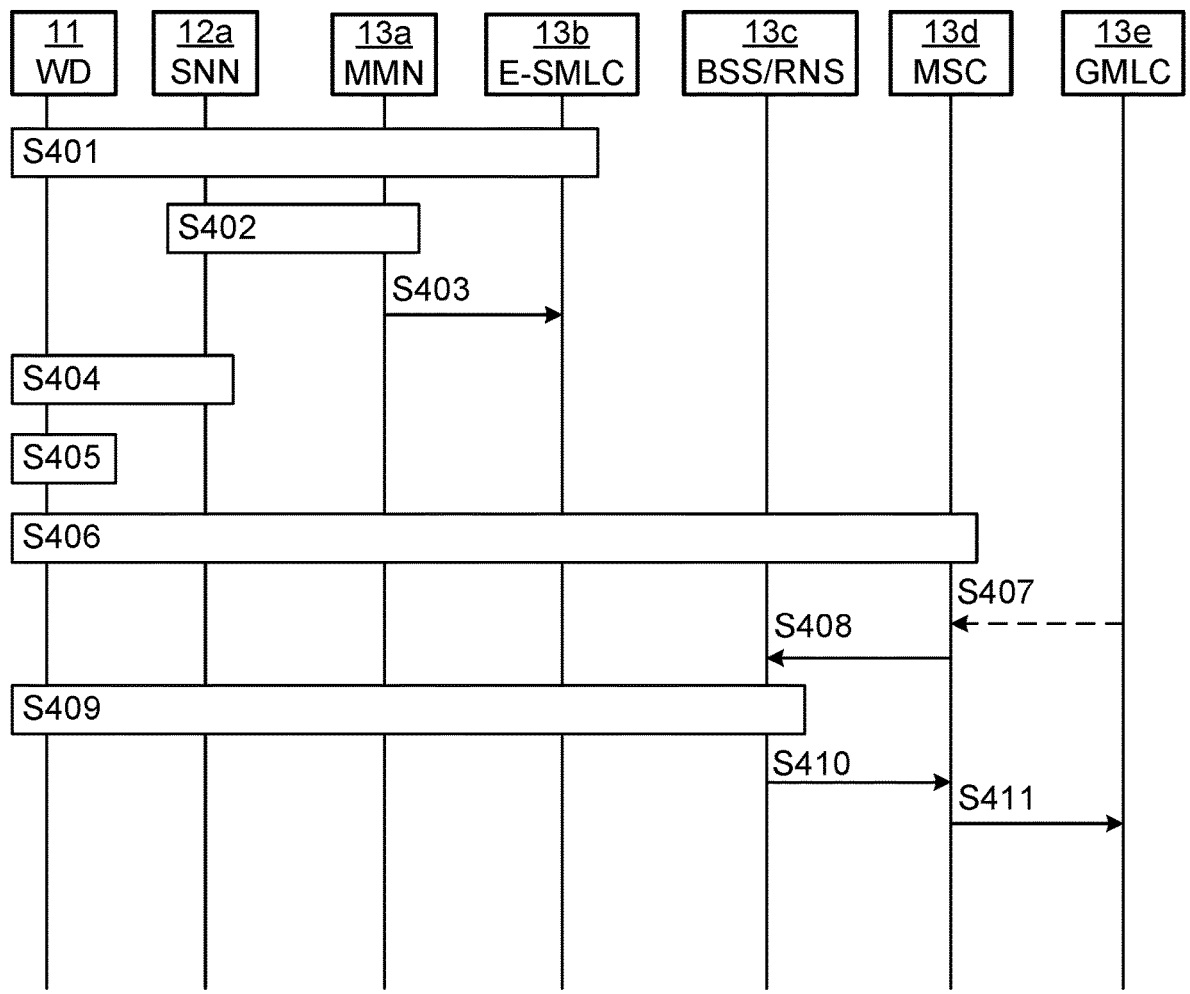

A second particular embodiment for position determination of a wireless device 11 based on at least some of the above disclosed embodiments will now be disclosed in detail with reference to the signaling diagram of FIG. 10. The second particular embodiment relates to an SR-VCC scenario.

S401: A positioning session of a wireless device 11 is ongoing where the E-SMLC 13b has started to exchange LPP messages with the wireless device 11. One way to implement step S401 is to perform any of step S102 and step S102a.

S402: The source network node 12a detects that handover to GERAN or UTRAN is required for the wireless device 11 and initiates an SR-VCC procedure with the mobility management node 13a. One way to implement step S402 is to perform any of step S102b and step S202.

S403: The mobility management node 13a identifies that a handover of the wireless device 11 will occur. The mobility management node 13a waits until a configured time after the start of the positioning session in step S401 has elapsed, or confirms that a configured number of LPP messages has been delivered to the wireless device 11 from the E-SMLC 13b. The mobility management node 13a then sends an LCS-AP Location Abort Request to the E-SMLC 13b. One way to implement step S403 is to perform any of step S206 and step S208.

S404: The SR-VCC procedure continues.

S405: The wireless device 11 keeps received Assistance Data and, if feasible, continues the started processing of received GNSS measurements. One way to implement step S405 is to perform any of step S106, S106a, and step S108.

S406: The wireless device 11 is handed over to a target network node 12b in GERAN or UTRAN. One way to implement step S406 is to perform any of step S106a and step S210.

S407: After having been informed of the handover of the wireless device 11, the GMLC 13e may send a location Request message.

S408: The MSC 13d sends a Location Request message to the BSS/RNS 13c.

S409: The BSS/RNS 13c initiates a positioning procedure.

S410: A Location Response message is sent by the BSS/RNS 13c to the MSC 13d.

S411: The MSC 13d sends a Location Response to the GMLC 13e.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for position determination of a wireless device, the method being performed by a mobility management node, the method comprising:
   detecting an indicator of a wireless device being operatively connected to a source radio access technology (RAT) the indicator requiring a handover of the wireless device to a target RAT and further requiring a position of the wireless device to be determined in case the mobility management node detects an Extended Service Request for mobile originating Circuit Switched Fallback (CSFB) indicating that a purpose is an emergency call; in response thereto:
   sending a Location Services Application Protocol (LCS-AP) location request message to an evolved serving mobile location center (E-SMLC) of the wireless device; and then
   sending, upon fulfillment of a criterion relating to the indicator of the wireless device, a LCS-AP location abort request message to the E-SMLC.

2. The method according to claim 1, wherein the indicator is an emergency call indicator.

3. The method according to claim 1, further comprising:
   monitoring transmission of assisted GNSS (A-GNSS) assistance data items from the E-SMLC to the wireless device; and
   wherein the criterion is fulfilled when a configured number of the data items have been sent from the E-SMLC to the wireless device.

4. The method according to claim 1, wherein the criterion is fulfilled when a configured time interval starting at the detection of the indicator has finished.

5. The method according to claim 1, further comprising:
   sending an S1-AP context modification request comprising a circuit switched fallback indicator to the source RAT upon having sent the LCS-AP location abort request.

6. A mobility management node for position determination of a wireless device, the mobility management node comprising a processor configured to:
   detect an indicator of a wireless device being operatively connected to a source radio access technology (RAT) the indicator requiring a handover of the wireless device to a target RAT and further requiring a position of the wireless device to be determined in case the mobility management node detects an Extended Service Request for mobile originating Circuit Switched Fallback (CSFB) indicating that a purpose is an emergency call; in response thereto:
   send a Location Services Application Protocol (LCS-AP) location request message to an evolved serving mobile location center (E-SMLC) of the wireless device; and then
   send, upon fulfillment of a criterion relating to the indicator of the wireless device, a LCS-AP location abort request message to the E-SMLC.

7. The mobility management node according to claim 6, wherein the mobility management node is a Mobility Management Entity (MME).

8. A nontransitory computer-readable medium comprising a computer program for position determination of a wireless device, the computer program comprising computer program code which, when run on a processor of a mobility management node, causes the processor to:
   detect an indicator of a wireless device being operatively connected to a source radio access technology (RAT) the indicator requiring a handover of the wireless device to a target RAT and further requiring a position of the wireless device to be determined in case the mobility management node detects an Extended Service Request for mobile originating Circuit Switched Fallback (CSFB) indicating that a purpose is an emergency call; in response thereto:
   send a Location Services Application Protocol (LCS-AP) location request message to an evolved serving mobile location center, E-SMLC, of the wireless device; and then
   send, upon fulfillment of a criterion relating to the indicator of the wireless device, a LCS-AP location abort request message to the E-SMLC.

* * * * *

UNITED STATES PATENT AND TRADEMARK OFFICE
CERTIFICATE OF CORRECTION

PATENT NO. : 10,667,236 B2
APPLICATION NO. : 16/450055
DATED : May 26, 2020
INVENTOR(S) : Crisci et al.

Page 1 of 1

It is certified that error appears in the above-identified patent and that said Letters Patent is hereby corrected as shown below:

In the Specification

In Column 1, Line 8, delete "2015" and insert -- 2015, now abandoned --, therefor.

In Column 4, Line 8, delete "eight" and insert -- eighth --, therefor.

In Column 4, Line 14, delete "eight" and insert -- eighth --, therefor.

In Column 4, Line 17, delete "eight" and insert -- eighth --, therefor.

In Column 5, Line 36, delete "source, network node" and insert -- source network node --, therefor.

In Column 5, Line 57, delete "fall back" and insert -- fallback --, therefor.

In Column 6, Line 45, delete "one or" and insert -- one or more --, therefor.

In Column 7, Lines 6-7, delete "complete procedure module 21d" and insert -- complete procedure module 21e --, therefor.

In Column 7, Line 19, delete "to from" and insert -- to form --, therefor.

In Column 7, Lines 36-37, delete "one or" and insert -- one or more --, therefor.

In Column 8, Line 5, delete "to from" and insert -- to form --, therefor.

In Column 12, Line 14, delete "continues its started" and insert -- continues the started --, therefor.

In Column 12, Line 18, delete "Fall back" and insert -- Fallback --, therefor.

Signed and Sealed this
Fifteenth Day of September, 2020

Andrei Iancu
*Director of the United States Patent and Trademark Office*